United States Patent Office 3,415,638
Patented Dec. 10, 1968

3,415,638
PROCESS FOR PREPARING AMMONIUM PHOSPHATE
John David Crowther Hemsley and Stanislaw Maria Janikowski, Felixstowe, Suffolk, England, assignors to Fisons Fertilizers Limited, Felixstowe, Suffolk, England
No Drawing. Filed Mar. 15, 1965, Ser. No. 439,978
Claims priority, application Great Britain, Mar. 26, 1964, 12,781/64; June 17, 1964, 25,168/64
11 Claims. (Cl. 71—36)

ABSTRACT OF THE DISCLOSURE

A process for making ammonium phosphate fertilizers is provided, wherein phosphoric acid and ammonia are reacted under pressure at a water content and temperature such that a solid product is obtained upon expulsion into a zone at ambient pressures.

---

The present invention relates to a method of making ammonium phosphates and mixed fertilizers containing them.

Ammonium phosphates may be treating phosphoric acid with ammonia. However, the amomnium phosphates so formed have to be solutions containing at least 30% by weight of water at a mole ratio of $NH_3:H_3PO_4$ of 1:1 or at least 15% by weight of water at a mole ratio $NH_3:H_3PO$ of 2:1. If less water than this is present solid ammonium phosphates form and the reaction slurry becomes difficult to handle. This is especially true if wet process phosphoric acid is used. In order to obtain a solid ammonium phosphate by this method a separate water reduction stage is necessary to remove water. It has now been found that if phosphoric acid, especially wet process phosphoric acid, is reacted with ammonia at superatmospheric pressures much lower water levels can be tolerated than hitherto and that upon passing the solutions obtained to a zone at ambient pressures, their already low water contents are further reduced and a solid product is obtained. In this way a separate water reduction stage is avoided and the reaction mixture can be handled throughout at low water contents.

Accordingly the present invention provides a process for preparing solid ammonium phosphates which comprises reacting phosphoric acid, for example wet process phosphoric acid containing less than 60% $P_2O_5$ by weight with ammonia gas under superatmospheric pressure to give a fluid ammonium phosphate solution at its boiling point containing 4% to 15% by weight of water and subsequently expelling the resulting fluid ammonium phosphate solution into a zone at ambient pressures thereby reducing its water content and giving a solid product.

The term ammonium phosphate is to be construed as extending to a salt substantially free from polyphosphates in which the mole ratio $NH_3:H_3PO_4$ is 0.8:1 to 2.1:1 and which may also contain up to 20% by weight of ammonium sulphate. The present invention is especially concerned with salts in which the mole ratio $NH_3:H_3PO_4$ is 1:1 to 1.5:1. An example of an ammonium phosphate envisaged is monoammonium phosphate.

Suitably the ammonium gas is reacted with the phosphoric acid at a superatmospheric pressure of 15 to 50 pounds per square inch gauge. Preferably the ammonia gas is reacted with the phosphoric acid at a superatmospheric pressure of 20 to 35 pounds per square inch gauge. The phosphoric acid may contain from 30% to 55% by weight of $P_2O_5$, but preferably contains 40%–52% by weight of $P_2O_5$. The temperature of the phosphoric acid may also be varied for example in the range from ambient temperatures to about 100° C. These two variables are inter-related and are used to control the reaction. Sulphuric acid may be used in admixture with the phosphoric acid.

When the fluid ammonium phosphate solution is expelled from the high pressure zone into the atmosphere its water content is greatly reduced due to flash evaporation and a solid ammonium phosphate is formed having a water content in the range 2% to 10% by weight.

Ammonium phosphate of different particulate forms may be obtained depending on the nature of the zone at ambient pressures into which the fluid ammonium phosphate solution is expelled. For instance the ammonium phosphate solution may be expelled into a prilling tower whereby prills of ammonium phosphate are obtained. The ammonium phosphate solution may also be expelled onto a conveyor belt from which the cooled solidified ammonium phosphate is removed by a flaker as flakes of ammonium phosphate. The particular ammonium phosphate obtained by these or other methods may be formed into fertilizers by blending with other fertilizer materials or by granulating the particulate ammonium phosphate in admixture with other fertilizer materials in any conventional manner.

The ammonium phosphate solution may also be formed into granules by a process which comprises mixing the ammonium phosphate solution with particulate solids, for example fertilizer materials and/or recycle material, and granulating the mixture. The ammonium phosphate solution is preferably mixed with the solids by expelling it, for example by spraying, on the solids. Granulation is preferably achieved by agitating the mixture, for example in a rotating drum or in a paddle mixer, at an appropriate temperature and water content. The temperature and water content during granulating will depend on the composition of the solids. If easily fusible substances such as ammonium nitrate are present the water content will be about 0.5 to 5.5% and the temperature will be in the range 20° C. to 95° C. depending on the water content. In the absence of easily fusible substances higher water levels will be necessary and higher temperatures will be permissible. After granulation it may be necessary to dry the granules and this can be done in a rotary drier or by any other means for example a fluidised bed. The granules are preferably screened to give oversize, product size and undersize. The oversize is ground and returned with the undersize to the granulation stage.

The other fertilizer materials with which solid ammonium phosphate may be blended or granulated or with which ammonium phosphate solution may be mixed and granulated may be ammonium salts such as ammonium nitrate or ammonium sulphate, phosphates such as triple superphosphate and single superphosphate, potassium salts such as potassium chloride, potassium sulphate, potassium phosphate and potassium nitrate, etc. Substances such as ammonium nitrate may also be used as concentrated solutions being sprayed in conjunction with the ammonium phosphate solution. A suitable granular fertilizer may be composed of ammonium phosphate, ammonium nitrate and potassium chloride.

The following examples, in which parts are by weight, are given to illustrate the process of the present invention.

Example 1

A stirred tank ammoniator at a pressure of 25 pounds per square inch gauge was charged with 50 parts by weight per hour of phosphoric acid containing 50% by weight of $P_2O_5$ and 6 parts by weight per hour of ammonia. A solution was formed at its boiling point, 165° C., containing 13% by weight of water, this level of water being maintained by the addition of small amounts of water. This solution was expelled through an expansion nozzle into a chamber at atmospheric pressure whereupon a solid monoammonium phosphate product was obtained having a water content of about 8% by weight.

Example 2

A stirred tank reactor is continuously fed with phosphoric acid containing 49% $P_2O_5$ at ambient temperatures and gaseous ammonia at a rate sufficient to maintain the reactor contents at a pH of 3.5 to 4.0, this being equivalent to a mole ratio, $NH_3:H_3PO_4$ of 1:1. The operating pressure of reactor is maintained at 33 pounds per square inch gauge. Under these conditions a solution of ammonium phosphate containing 10–12% by weight of water is formed at its boiling point of 170° C. The desired reaction temperature and water content are maintained by a small flow of water into the reactor. The reactor contents are granulated by spraying into a bed of fertilizer materials in a rotating drum. During spraying the water content of the ammonium phosphate is reduced to 6%–8% by weight. The granulation is effected by spraying 1 part of the ammonium phosphate and 2.33 parts of ammonium nitrate solution at a temperature of 140° C. and containing water 5% by weight onto 0.7 part of potassium chloride and 5 parts of recycle material in a rotating drum. The granules thus formed were dried to give a solid product having a temperature of 90° C. The resulting granules analysed at 22:11:11.

Example 3

A stirred tank reactor is continuously fed with 43% $P_2O_5$ phosphoric acid and preheated to 80–90° C. and gaseous ammonia at a rate sufficient to maintain the reactor contents at a pH of 3.5 to 4.0 this being equivalent to a mole ratio $NH_3:H_3PO_4$ of 1:1. The operating pressure of the reactor is maintained at 33 pounds per square inch gauge. Under these conditions the reaction temperature is approximately 170° C. and the solution of ammonium phosphate contains 10–12% by weight of water. The reactor contents are sprayed through a pressure nozzle into a void tower with natural air draught whereupon a significant quantity of water is flashed off. Solid ammonium phosphate product containing 6 to 8% water is drawn off from the bottom of the tower. The size range of the product is in the range 0.1 to 1.0 millimetre.

Example 4

The process of Example 3 was repeated except that reactor contents are sprayed through a pressure nozzle onto a moving belt whereupon the solution immediately solidified into a brittle porous sheet. At the discharge end of the belt the sheet was broken up by a flail type breaker. While on the belt the product continued to lose moisture and gave a solid containing 5 to 7% water.

Example 5

A stirred tank reactor is continuouosly fed with phosphoric acid containing 45% $P_2O_5$ at a temperature in the range 10 to 30° C. and gaseous ammonia at a rate sufficient to maintain the mole ratio $NH_3:H_3PO_4$ at 1.5:1. The operating pressure of the reactor is maintained at 26 pounds per square inch gauge and the reaction temperature is in the range 140–150° C. The reactor contents are sprayed through a pressure nozzle into a rotating granulator drum containing recycle fines. The granules obtained are dried and sized, ground oversize and fines being returned to the granulator as recycle fines. The water content of the finished product is 4 to 6%.

We claim:

1. A process for preparing ammonium phosphate having an $NH_3:H_3PO_4$ mole ratio 1:1 to 1.5:1 which comprises reacting phosphoric acid containing 40% to 52% by weight of $P_2O_5$ with ammonia gas under a pressure of 20 to 35 pounds per square inch gauge to give a fluid ammonium phosphate solution at its boiling point containing 4% to 15% by weight of water and subsequently expelling the resulting ammonium phosphate solution into a zone at ambient pressures thereby reducing its water content to 2 to 10% by weight and giving a solid product.

2. A process for preparing ammonium phosphates having an $NH_3:H_3PO_4$ mole ratio in the range 1:1 to 1.5:1 which comprises reacting phosphoric acid containing 40% to 52% by weight $P_2O_4$ with ammonia gas under a pressure of 20 to 35 pounds per square inch gauge to give a fluid ammonium phosphate solution at its boiling point containing 4% to 15% by weight of water and subsequently expelling the resulting ammonium phosphate into a prilling tower at ambient pressures whereby prills of ammonium phosphate are obtained having a water content in the range 2% to 10% by weight.

3. A process for preparing ammonium phosphates having a $NH_3:H_3PO_4$ mole ratio of 0.8:1 to 2.1:1, which comprises reacting phosphoric acid containing 30% to 55% $P_2O_5$ with ammonia gas under superatmospheric pressure to give a fluid ammonium phosphate solution at its boiling point containing 4% to 15% by weight of water and subsequently expelling the resulting ammonium phosphate solution into a zone at ambient pressures and reducing its water content to form a solid product.

4. A process for preparing ammonium phosphates having a $NH_4:H_3PO_4$ mole ratio of 0.8:1 to 2.1:1, which comprises reacting phosphoric acid containing 30% to 55% $P_2O_5$ with ammonia gas under a pressure of 15 to 50 pounds per square inch gauge to give a fluid ammonium phosphate solution at its boiling point containing 4% to 15% by weight of water and subsequently expelling the resulting ammonium phosphate solution into a zone at ambient pressures thereby reducing its water content to 2% to 10% by weight and giving a solid product.

5. A process for preparing ammonium phosphates having a $NH_3:H_3PO_4$ mole ratio of 0.8:1 to 2.1:1, which comprises reacting phosphoric acid containing 30% to 55% $P_2O_5$ with ammonia gas under a pressure of 15 to 50 pounds per square inch gauge to give a fluid ammonium phosphate solution at its boiling point containing 4% to 15% by weight of water and subsequently expelling the resulting phosphate solution into a prilling tower at ambient pressures whereby prills of ammonium phosphate are obtained having a water content in the range 2% to 10% by weight.

6. A process for preparing ammonium phosphates having a $NH_3:H_3PO_4$ mole ratio of 0.8:1 to 2.1:1, which comprises reacting phosphoric acid containing 30% to 55% $P_2O_5$ by weight with ammonia gas under a pressure of 15 to 50 pounds per square inch gauge to give a fluid ammonium phosphate solution at its boiling point containing 4% to 15% by weight of water and subsequently mixing the resulting ammonium phosphate solution with particule solids at ambient pressures and granulating the mixture.

7. A process as claimed in claim 6 wherein the solids comprise fertilizer material.

8. A process for preparing ammonium phosphates having an $NH_3:H_3PO_4$ mole ratio in the range 1:1 to 1.5:1 which comprises reacting phosphoric acid containing 40% to 52% by weight $P_2O_5$ with ammonia gas under a pressure of 20 to 35 pounds per square inch gauge to give a fluid ammonium phosphate solution at its boiling point containing 4% to 15% by weight of water and subsequently expelling the resulting ammonium phosphate solution onto a conveyor belt at ambient pressures, reducing the water content of the resultant product to form a solid sheet, and breaking the solid sheet into flakes.

9. A process as claimed in claim 6 wherein the mixture is granulated using a process which comprises admixing the mixture with water, and agitating the resultant mixture.

10. A process for preparing ammonium phosphates having an $NH_3:H_3PO_4$ mole ratio in the range 1:1 to 1.5:1 which comprises reacting phosphoric acid containing 40% to 52% by weight of $P_2O_5$ with ammonia gas under a pressure of 20 to 35 pounds per square inch to give a fluid ammonium phosphate solution at its boiling point containing 4% to 15% by weight of water and subsequently spraying the resulting ammonium phosphate solution onto a bed of particulate fertilizer materials which are being agitated at ambient pressures to form granules, drying the granules, sizing the granules, crushing the oversized granules, and returning the crushed granules and undersized granules to the bed of solids.

11. A process for preparing ammonium phosphates having a $NH_3:H_3PO_4$ mole ratio of 0.8:1 to 2.1:1, which comprises reacting phosphoric acid containing 30% to 55% $P_2O_5$ with ammonia gas under a pressure of 15 to 50 pounds per square inch gauge to give a fluid ammonium phosphate solution at its boiling point containing 4% to 15% by weight of water and subsequently expelling the resulting ammonium phosphate solution onto a conveyor belt at ambient pressures, reducing the water content of the resultant product to form a solid sheet, and breaking the solid sheet into flakes.

References Cited

UNITED STATES PATENTS

| | | | |
|---|---|---|---|
| 2,614,040 | 10/1952 | Kaikinger | 71—36 |
| 2,912,318 | 11/1959 | Kieweg | 71—64 X |
| 2,946,655 | 7/1960 | Helm et al. | 71—64 X |
| 2,970,888 | 2/1961 | Helm et al. | 71—64 X |
| 3,037,855 | 6/1962 | Smith | 71—43 X |
| 3,130,033 | 4/1964 | Stephens | 71—43 X |
| 3,207,595 | 9/1965 | Tucker et al. | 71—64 X |

OTHER REFERENCES

Sauchelli, V., Nitrogen Fertilizer, Reinhold, New York, (1964) pp. 141, 144–145, 147, 150–152. TP 963 52f.

DONALL H. SYLVESTER, *Primary Examiner.*

T. G. FERRIS, *Assistant Examiner.*

U.S. Cl. X.R.

71—64, 43; 23—107